(12) United States Patent
Kuravangi-Thammaiah et al.

(10) Patent No.: US 12,074,919 B1
(45) Date of Patent: Aug. 27, 2024

(54) SYSTEMS AND METHODS FOR REAUTHORIZATION REQUEST NOTIFICATION

(71) Applicant: Verizon Patent and Licensing Inc., Basking Ridge, NJ (US)

(72) Inventors: Shanthala Kuravangi-Thammaiah, Keller, TX (US); Jerry Steben, Fort Worth, TX (US); Sudhakar Reddy Patil, Flower Mound, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/304,962

(22) Filed: Apr. 21, 2023

(51) Int. Cl.
*G06F 13/00* (2006.01)
*H04L 65/1069* (2022.01)
*H04L 65/1073* (2022.01)
*H04L 65/1083* (2022.01)

(52) U.S. Cl.
CPC ...... *H04L 65/1069* (2013.01); *H04L 65/1073* (2013.01); *H04L 65/1083* (2013.01)

(58) Field of Classification Search
CPC ............. H04L 65/1069; H04L 65/1073; H04L 65/1083
USPC ......... 709/228, 227; 726/4, 21, 17; 713/502; 714/55
See application file for complete search history.

(56) References Cited

U.S. PATENT DOCUMENTS

| | | | | |
|---|---|---|---|---|
| 8,594,621 | B2 * | 11/2013 | Mo | H04L 41/5029 455/406 |
| 8,666,793 | B2 * | 3/2014 | Guionnet | G06Q 30/0283 705/400 |
| 2009/0076984 | A1 * | 3/2009 | Guionnet | G06Q 30/0283 705/400 |
| 2012/0303795 | A1 * | 11/2012 | Mo | H04L 41/5067 709/224 |
| 2013/0084826 | A1 * | 4/2013 | Mo | H04L 12/1407 455/406 |

\* cited by examiner

*Primary Examiner* — Kenneth R Coulter (57) ABSTRACT

In some implementations, a network device may receive a subscription request to subscribe to receive notifications associated with context data related to a registered session associated with a user equipment (UE). The registered session may be associated with a reauthorization timer that is associated with triggering the network device to provide a request for reauthorization of the registered session. The network device may provide, based on an expiration of the reauthorization timer, the request for reauthorization of the registered session.

20 Claims, 5 Drawing Sheets

SYSTEMS AND METHODS FOR REAUTHORIZATION REQUEST NOTIFICATION

BACKGROUND

A session setup procedure establishes a session between a user equipment (UE) and a network, such as a wired or wireless network. In a session setup procedure, network devices create and/or exchange session context data, which includes various parameters and/or attributes associated with establishing, managing, and/or maintaining a session associated with the UE. For example, one or more network devices may use the session context data to allocate resources, enforce policies, and/or provide efficient connectivity for the UE within the network.

DETAILED DESCRIPTION OF EXAMPLE EMBODIMENTS

The following detailed description of example implementations refers to the accompanying drawings. The same reference numbers in different drawings may identify the same or similar elements.

Session context data may be stored by a unified data management (UDM) device and/or a unified data repository (UDR) device. The UDM device and/or the UDR device may enable one or more network devices to access, use, and/or exchange the session context data to allocate resources, enforce policies, and/or provide efficient connectivity for a user equipment (UE) within a network (e.g., a wired or wireless network), among other examples. However, the UDM device and/or the UDR device generally does not remove the session context data unless a network device requests that the UDM device and/or the UDR device remove the session context data.

For example, a network device (e.g., a session management function (SMF) device) may initiate a removal operation or procedure (e.g., a clean-up operation or procedure) to remove the session context data stored by the UDM device and/or the UDR device (e.g., based on a termination of the session, based on the UE being disconnected from the network, and/or based on an expiration of a registration timer). As an example, the network device may initiate a deregistration procedure to remove the session context data from the UDM device and/or the UDR device (e.g., based on the termination of the session and/or based on the UE being disconnected from the network). As another example, upon expiration of a registration timer (e.g., which is associated with a time period during which the registration of the UE is valid), the network device may initiate a disconnect procedure to remove the session context data from the UDM device and/or the UDR device.

However, in some cases, the network device cannot correctly perform the removal operation or procedure (e.g., because of network issues, network device failure, UE issues, and/or improper configurations, among other examples), which results in the UDM device and/or the UDR device storing stale session context data (e.g., session context data that is invalid and/or inaccurate). Furthermore, because the session context data stored by the UDM device and/or the UDR device is not associated with an expiry timer, the UDM device and/or the UDR device may store the stale session context data indefinitely and/or may accumulate a large amount of stale context data.

Storing stale session context data wastes resources (e.g., processing resources and/or memory resources, among other examples) that could have otherwise been conserved and/or used elsewhere (e.g., to store session context data that is valid and accurate). Additionally, if the stale session context data is propagated to a network device (e.g., an access and mobility management function (AMF) device, an SMF device, a network exposure function (NEF) device, and/or a user plane function (UPF) device, among other examples), then the network device may provision the UE with session context data that is invalid and/or inaccurate, which may negatively affect network performance, may negatively affect dynamic data associated with a subscriber profile that is associated with the UE, and/or may consume resources.

For example, if the UE moves from a first location to a second location, then the network device may assign the UE to a new network slice based on the stale session context data. For example, if the network device has access only to stale location information indicating that the UE is in the first location rather than current location information indicating that the UE is in the second location, then the network device may assign the UE to a network slice that is optimized for the first location (even though the UE has moved to the second location). If this happens, then the UE may be assigned to multiple network slices (e.g., simultaneously), with different network slices allocated to different parts of the session. This can negatively impact network performance, increase network complexity, and/or lead to network issues and/or failures (e.g., based on conflicts between the different network slices).

As another example, if the network device provisions the UE with stale quality of service (QoS) data that indicates an upgraded QoS level (e.g., low latency) associated with the UE rather than current QoS data that indicates a standard QoS level (e.g., standard latency) associated with the UE, then the dynamic data associated with the subscriber profile is not accurate and resources may be consumed that could have otherwise been conserved and/or used elsewhere (e.g., because more resources are used to provide the upgraded QoS level than the standard QoS level).

Some implementations described herein enable a first network device, such as an SMF device, to provide a reauthorization request notification to a second network device, such as a UDM or UDR device. In some implementations, the SMF device may create session context data related to a registered session associated with a UE. For example, the SMF device may create the session context data in response to receiving a session establishment request from an AMF device or another suitable network device. The SMF device may store the session context data locally (e.g., in a cache) and/or may store the session context data in the UDM device and/or the UDR device.

The SMF may provide, and the UDM device and/or the UDR device may receive, a subscription request to subscribe to receive notifications associated with the session context data (e.g., related to the registered session associated with the UE). In some implementations, the registered session may be associated with a reauthorization timer that is associated with triggering the UDM device and/or the UDR device to provide the reauthorization request notification to the SMF device. The UDM device and/or the UDR device may provide, and the SMF device may receive, the reauthorization request notification based on an expiration of the reauthorization timer. The reauthorization request notification may indicate a request for reauthorization of the registered session. The request for reauthorization of the registered session may indicate the session context data associated with the registered session (e.g., the request for reauthorization of the registered session may indicate an identifier of the registered session).

In some implementations, the UDM device and/or the UDR device may determine whether the registered session is authorized based on receiving an indication of a status of the registered session (e.g., from the SMF device). Accordingly, for example, the SMF device may determine the status of the registered session based on the request for reauthorization of the registered session. To determine the status of the registered session, for example, the SMF device may compare the session context data stored locally by the SMF device and the session context data indicated by the request for reauthorization of the registered session to determine whether the session context data that is stored locally matches the session context data indicated by the request for reauthorization of the registered session, as described in more detail elsewhere herein.

For example, the SMF device may determine that the registered session is active based on determining that the session context data stored locally matches the session context data indicated by the request for reauthorization of the registered session. As another example, the SMF device may determine that the registered session is inactive (e.g., not active) based on determining that the session context data stored locally does not match the session context data indicated by the request for reauthorization of the registered session. The SMF device may provide, and the UDM device and/or the UDR device may receive, a communication indicating the status of the registered session (e.g., indicating that the registered session is active or inactive).

In some implementations, the UDM device and/or the UDR device may determine that the registered session is reauthorized based on the communication indicating the status of the registered session. For example, the UDM device and/or the UDR device may determine that the registered session is reauthorized based on the communication indicating that the registered session is active. As another example, the UDM device and/or the UDR device may determine that the registered session is not reauthorized based on the communication indicating that the registered session is inactive.

In some implementations, the UDM device and/or the UDR device may perform an action based on determining that the registered session is inactive. For example, the UDM device and/or the UDR device may perform a removal operation (e.g., a clean-up operation) based on determining that the session is inactive. In this way, some implementations described herein enable stale session context data (e.g., associated with an inactive registered session) stored by the UDM device and/or the UDR device to be removed, enable optimization of dynamic data associated with a subscriber profile (e.g., the dynamic data associated with the subscriber profile is accurate and up to date), and reduce a risk of the UE being assigned to multiple network slices based on stale session context data.

Figure 1:
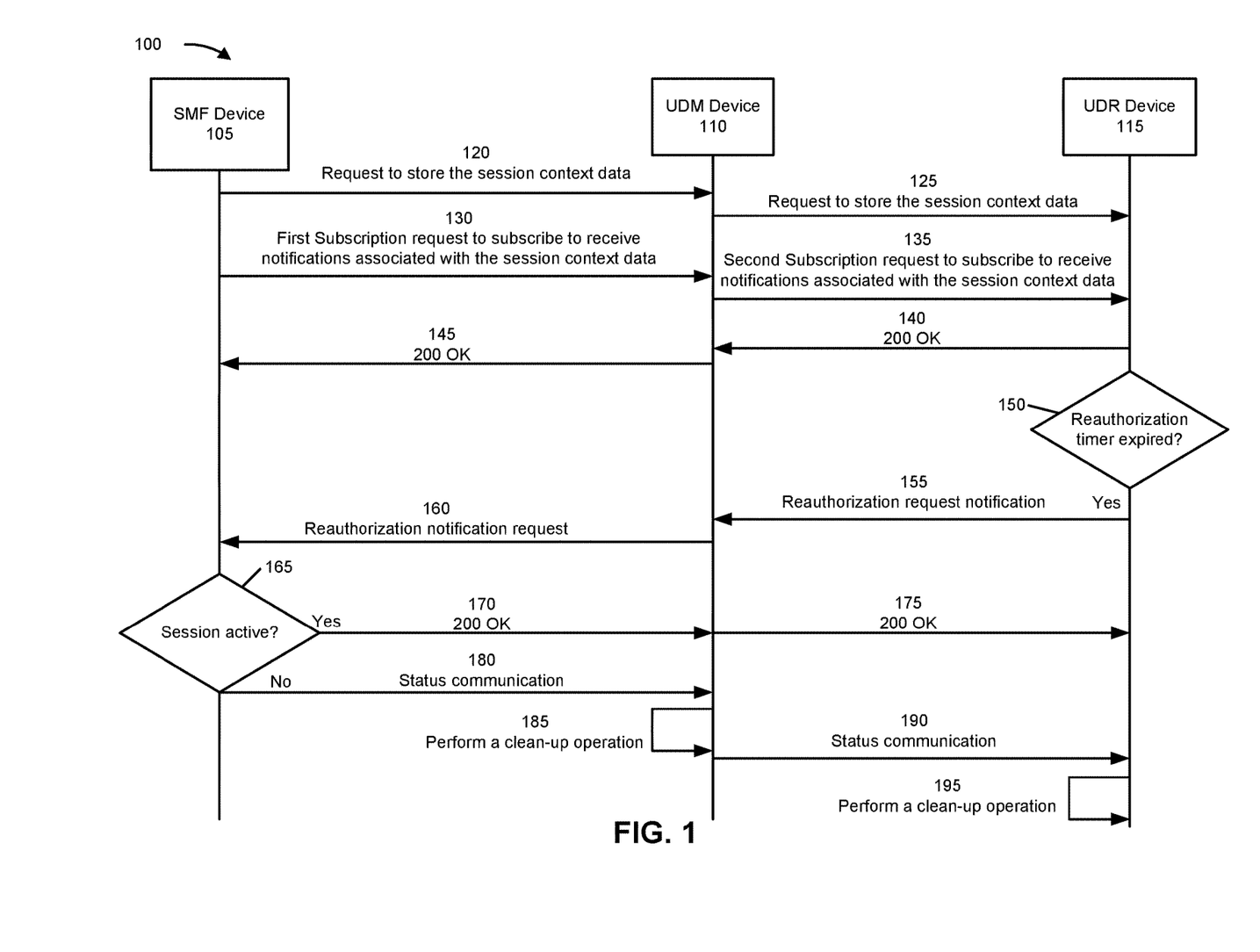
FIG. 1 is a diagram of an example embodiment associated with a reauthorization request notification.

FIG. 1 is a diagram of an example 100 associated with providing a reauthorization request notification. As shown in FIG. 1, example 100 includes an SMF device 105, a UDM device 110, and a UDR device 115.

As shown in FIG. 1, and by reference number 120, the SMF device 105 may provide, and the UDM device 110 may receive, a request to store session context data. In some implementations, the SMF device 105 may create session context data related to a registered session associated with a UE. For example, the SMF device 105 may create the session context data in response to receiving a session establishment request from another network device (e.g., an AMF device may provide a packet data unit (PDU) session establishment request to the SMF device 105 in response to receiving the PDU session establishment request from the UE).

In some implementations, the session context data related to the registered session associated with the UE may indicate an identifier of the registered session (e.g., a unique identifier assigned to a registered session associated with a UE), a registered session type (e.g., Internet Protocol (IP) version 4 (IPv4) or IP version 6 (IPv6), among other examples), one or more quality of service (QoS) parameters (e.g., indicating a level of service and/or performance associated with the registered session), user plane traffic routing rules (e.g., indicating how user plane traffic associated with the UE is to be routed during the registered session), network slice information (e.g., indicating a network slice associated with the registered session or including a slice identifier and associated policies, among other examples), and/or SMF device and/or UPF device instances (e.g., associated with the registered session and/or managing resources associated with the registered session), among other examples. Additionally, for example, the session context data may indicate binding information (e.g., identifying the UPF device associated with managing the registered session), security context information (e.g., indicating security mechanisms and/or protocols used to protect the registered session), and/or charging and policy information (e.g., indicating charging policies and/or policies associated with resource allocation and usage for the registered session), among other examples.

The SMF device 105 may store the session context data locally (e.g., in a cache of the SMF device) and/or may store the session context data in the UDM device 110 and/or the UDR device 115. Thus, in some implementations, the request to store the session context data may include an indication of the session context data (e.g., associated with the registered session). The UDM device 110 may store the session context data (associated with the registered session) based on the indication of the session context data (e.g., included in the request to store the session context data).

As further shown in FIG. 1, and by reference number 125, the UDM device 110 may provide, and the UDR device 115 may receive, a request to store the session context data. As an example, the UDM device 110 may provide, and the UDR device 115 may receive, the request to store the session context data based on the session context data including data that is stored by the UDR device 115 (e.g., in a resource structure of the UDR device). As an example, if the session context data includes subscription data (e.g., associated with the UE and/or a subscriber profile associated with the UE) that is stored by the UDR device 115, then the request to store the session context data may include an indication of the subscription data. The UDR device 115 may store the subscription data based on the indication of the subscription data from the UDM device 110.

As further shown in FIG. 1, and by reference number 130, the SMF device 105 may provide, and the UDM device 110 may receive, a first subscription request to subscribe to receive notifications associated with the session context data (e.g., related to the registered session associated with the UE). As further shown in FIG. 1, and by reference number 135, the UDM device 110 may provide, and the UDR device 115 may receive, a second subscription request to subscribe to receive notifications associated with the session context data (e.g., related to the registered session associated with the UE). In other words, the UDM device 110 may receive the first subscription request from the SMF device 105, and the UDM device 110 may forward the second subscription request (e.g., which includes a similar payload as the first subscription request) to the UDR device 115.

As further shown in FIG. 1, and by reference number 140, the UDR device 115 may provide, and the UDM device 110 may receive a communication that confirms that a subscription to receive the notifications associated with the session context data is created (e.g., a "200 OK" message generated by the UDR device 115 based on the second subscription request). As further shown in FIG. 1, and by reference number 145, the UDM device 110 may provide, and the SMF device 105 may receive a communication that confirms that a subscription to receive the notifications associated with the session context data is created (e.g., a "200 OK" message that the UDM device 110 generates based on the first subscription request). In some implementations, the registered session may be associated with a reauthorization timer that is associated with triggering the UDR device 115 to provide the reauthorization request notification (e.g., to the UDM device 110), as described in more detail elsewhere herein. In some implementations, the reauthorization timer may be associated with a mobile network operator (MNO). For example, the MNO may configure the reauthorization timer and/or may associate the reauthorization timer with the session context data associated with the UE. In some implementations, the reauthorization timer may be a periodic reauthorization timer (e.g., to enable the UDM device 110 and/or the UDR device 115 to provide the reauthorization notification request at periodic time intervals).

As shown further shown in FIG. 1, and by reference number 150, the UDR device 115 may determine whether the reauthorization timer is expired. For example, to determine whether the reauthorization timer is expired, the UDR device 115 may compare a current time with a time indicated by the reauthorization timer. For example, the UDR device 115 may determine that the reauthorization timer is expired based on determining that the current time is later than the time indicated by the reauthorization timer or that a threshold amount of time has elapsed since the reauthorization was started. The UDR device 115 may perform an action based on determining that the reauthorization is expired, as described in more detail elsewhere herein.

As further shown in FIG. 1, and by reference number 155, the UDR device 115 may provide, and the UDM device 110 may receive, a reauthorization request notification. In some implementations, the UDR device 115 may provide, and the UDM device 110 may receive, the reauthorization request notification based on an expiration of the reauthorization timer. In some implementations, the reauthorization request notification may indicate a request for reauthorization of the registered session. The request for reauthorization of the registered session may indicate the session context data associated with the registered session (e.g., the request for reauthorization of the registered session may indicate an identifier of the registered session and/or other information indicated by the session context data).

As further shown in FIG. 1, and by reference number 160, the UDM device 110 may provide, and the SMF device 105 may receive, the reauthorization request notification. As an example, the UDM device 110 may provide, and the SMF device 105 may receive, the reauthorization request notification in response to the reauthorization request notification from the UDR device 115. In other words, the UDM device 110 may receive the reauthorization request notification from the UDR device 115, and the UDM device 110 may forward the reauthorization request notification to the SMF device 105.

As further shown in FIG. 1, and by reference number 165, the SMF device 105 may determine whether the registered session is active (e.g., in response to the request for reauthorization of the registered session indicated by the reauthorization request notification). In some implementations, to determine whether the registered session is active, the SMF device 105 may perform a lookup operation using the session context data indicated by the request for reauthorization of the registered session. For example, if the session context data indicated by the request for reauthorization of the registered session is the identifier of the registered session, then the SMF device 105 may perform a lookup operation to determine whether the identifier of the registered session is stored by the SMF device 105 (e.g., to determine whether the identifier of the registered session is stored in the cache of the SMF device 105). As an example, the SMF device 105 may determine that the registered session is active based on determining that the session context data indicated by the reauthorization request notification is stored by the SMF device 105 (e.g., based on determining that the session context data indicated by the reauthorization request notification is stored in the cache of the SMF device 105). As another example, the SMF device 105 may determine that the registered session is inactive based on determining that the session context data indicated by the reauthorization request notification is not stored by the SMF device 105 (e.g., based on determining that the session context data indicated by the reauthorization request notification is not stored in the cache of the SMF device 105).

As further shown in FIG. 1, and by reference number 170, the SMF device 105 may provide, and the UDM device 110 may receive, a communication to indicate that the registered session is active based on determining that the registered session is active. As an example, the SMF device 105 may provide, and the UDM device 110 may receive, a "200 OK" communication based on determining that the registered session is active. Thus, in some implementations, the "200 OK" communication may indicate that the registered session is active. As further shown in FIG. 1, and by reference number 175, the UDM device 110 may provide, and the UDR device 115 may receive, the "200 OK" communication that indicates that the registered session is active. In other words, the UDM device 110 may receive the "200 OK" communication from the SMF device 105 and may forward the "200 OK" communication to the UDR device 115.

Alternatively, as further shown in FIG. 1, and by reference number 180, the SMF device 105 may provide, and the UDM device 110 may receive a status communication. As an example, the SMF device 105 may provide, and the UDM device 110 may receive, the status communication based on determining that the registered session is inactive. As an example, the status communication may include the identifier of the registered session (e.g., to enable the UDM device 110 and/or the UDR device 115 to identify the session context data stored by the UDM device 110 and/or the UDR device 115, as described in more detail elsewhere herein). In some implementations, the status communication may include an attribute that indicates that the registered session is inactive. For examples, the attribute may be included in a JavaScript Object Notation (JSON) payload included in the status communication. Although the attribute is described as being included in the JSON payload associated with the status communication, the attribute may be included in any suitable payload associated with the status communication. For example, the attribute may be included an in Extensible Markup Language (XML) payload associated with the status communication.

As further shown in FIG. 1, and by reference number 185, the UDM device 110 may perform a clean-up operation based on the status communication. For example, the UDM device 110 may perform the clean-up operation based on the status communication indicating that the registered session is not active. In some implementations, to perform the clean-up operation, the UDM device 110 may identify the session context data associated with the inactive registered session (e.g., by using the identifier of the registered session indicated by the status communication). As an example, the UDM device 110 may delete the session context data associated with the inactive registered session. Although the UDM device 110 is described as performing the clean-up operation, in some implementations, the UDM device 110 may be stateless and, therefore, does not need to perform the clean-up operation to remove the session context data associated with the inactive registered session.

As further shown in FIG. 1, and by reference number 190, the UDM device 110 may provide, and the UDR device 115 may receive, the status communication that indicates that the registered session is inactive. In other words, the UDM device 110 may receive the status communication from the SMF device 105 and may forward the status communication to the UDR device 115.

As further shown in FIG. 1, and by reference number 195, the UDR device 115 may perform a clean-up operation. For example, the UDR device 115 may perform the clean-up operation to remove the session context data associated with the inactive registered session in a similar manner that the UDM device 110 performs the clean-up operation to remove the session context data as described in connection with reference number 185, and/or as described in more detail elsewhere herein.

In this way, some implementations described herein enable stale session context data (e.g., associated with a registered session that is inactive) stored by the UDM device and/or the UDR device to be removed, enable optimization of dynamic data associated with a subscriber profile (e.g., the dynamic data associated with the subscriber profile is accurate and up to date), and reduce a risk of the UE being assigned to multiple network slices (e.g., based on stale session context data).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
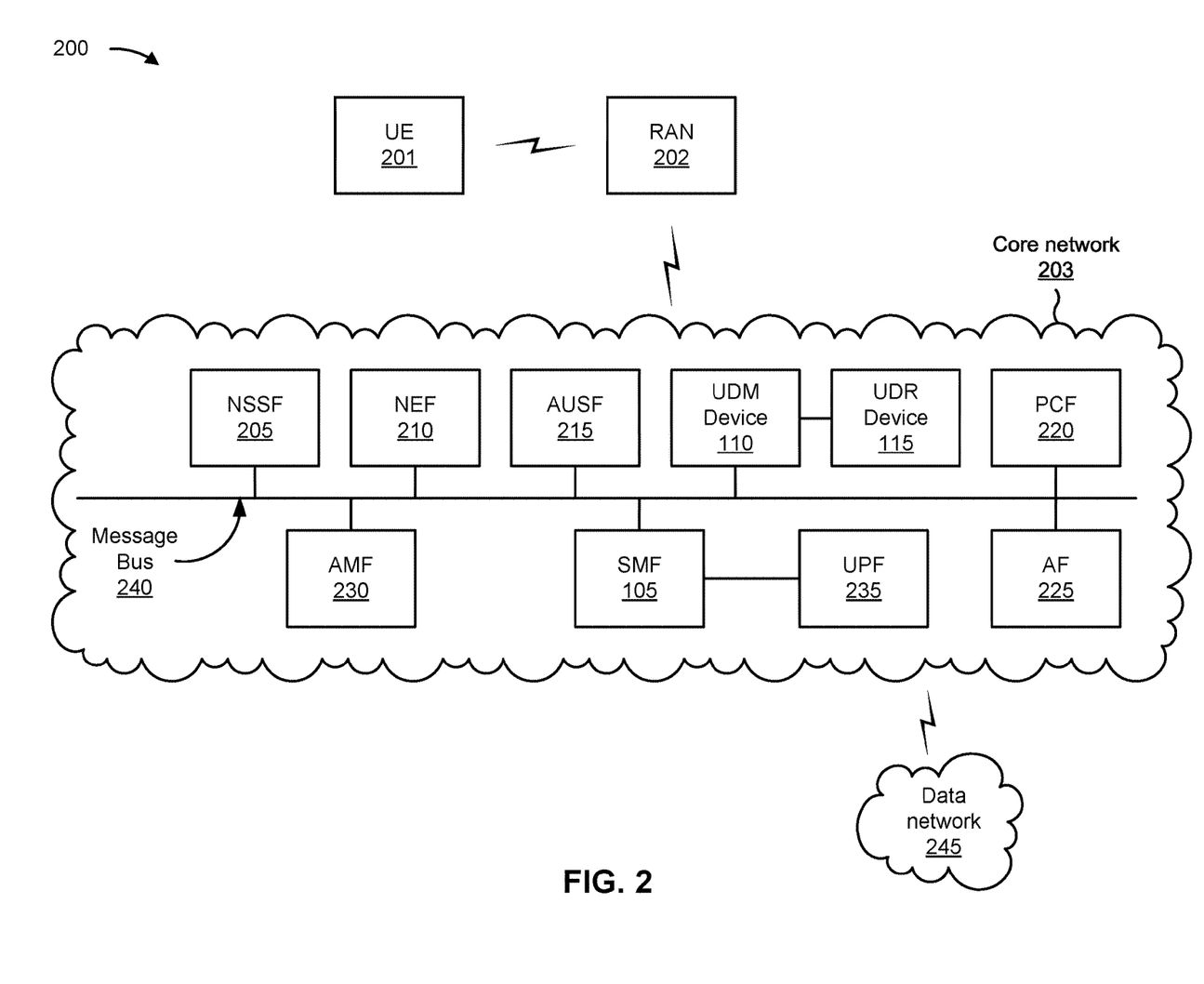
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include an SMF device 105, a UDM device 110, a UDR device 115, a UE 201, a RAN 202, a core network 203, and a data network 245. Devices and/or networks of example environment 200 may interconnect via wired connections, wireless connections, or a combination of wired and wireless connections.

UE 201 includes one or more devices capable of receiving, generating, storing, processing, and/or providing information, such as information described herein. For example, UE 201 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 202 may support, for example, a cellular radio access technology (RAT). RAN 202 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 201. RAN 202 may transfer traffic between UE 201 (e.g., using a cellular RAT), one or more base stations (e.g., using a wireless interface or a backhaul interface, such as a wired backhaul interface), and/or core network 203. RAN 202 may provide one or more cells that cover geographic areas.

In some implementations, RAN 202 may perform scheduling and/or resource management for UE 201 covered by RAN 202 (e.g., UE 201 covered by a cell provided by RAN 202). In some implementations, RAN 202 may be controlled or coordinated by a network controller, which may perform load balancing, network-level configuration, and/or other operations. The network controller may communicate with RAN 202 via a wireless or wireline backhaul. In some implementations, RAN 202 may include a network controller, a self-organizing network (SON) module or component, or a similar module or component. In other words, RAN 202 may perform network control, scheduling, and/or network management functions (e.g., for uplink, downlink, and/or sidelink communications of UE 201 covered by RAN 202).

In some implementations, core network 203 may include an example functional architecture in which systems and/or methods described herein may be implemented. For example, core network 203 may include an example architecture of a fifth generation (5G) next generation (NG) core network included in a 5G wireless telecommunications system. While the example architecture of core network 203 shown in FIG. 2 may be an example of a service-based architecture, in some implementations, core network 203 may be implemented as a reference-point architecture and/or a 4G core network, among other examples.

As shown in FIG. 2, core network 203 may include a number of functional elements. The functional elements may include, for example, the SMF device 105, the UDM device 110, the UDR device 115, a network slice selection function (NSSF) 205, a NEF device 210, an authentication server function (AUSF) 215, a policy control function (PCF) 220, an application function (AF) 225, an access and mobility management function (AMF) 230, and/or a user plane function (UPF) 235. These functional elements may be communicatively connected via a message bus 240. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

SMF device 105 includes one or more devices that support the establishment, modification, and release of communication sessions in the wireless telecommunications system. For example, SMF device 105 may configure traffic steering policies at UPF 235 and/or may enforce user equipment IP address allocation and policies, among other examples.

UDM device 110 includes one or more devices that store user data and profiles in the wireless telecommunications system. UDM device 110 may be used for fixed access and/or mobile access in core network 203. The user data and profiles may be stored in the UDR device 115, which includes a data repository for storing the user data and profiles.

NSSF 205 includes one or more devices that select network slice instances for UE 201. By providing network slicing, NSSF 205 allows an operator to deploy multiple substantially independent end-to-end networks potentially with the same infrastructure. In some implementations, each slice may be customized for different services.

The NEF device 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 201 in the wireless telecommunications system.

PCF 220 includes one or more devices that provide a policy framework that incorporates network slicing, roaming, packet processing, and/or mobility management, among other examples.

AF 225 includes one or more devices that support application influence on traffic routing, access to the NEF device 210, and/or policy control, among other examples.

AMF 230 includes one or more devices that act as a termination point for non-access stratum (NAS) signaling and/or mobility management, among other examples.

UPF 235 includes one or more devices that serve as an anchor point for intra-RAT and/or inter-RAT mobility. UPF 235 may apply rules to packets, such as rules pertaining to packet routing, traffic reporting, and/or handling user plane QoS, among other examples.

Message bus 240 represents a communication structure for communication among the functional elements. In other words, message bus 240 may permit communication between two or more functional elements.

Data network 245 includes one or more wired and/or wireless data networks. For example, data network 245 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
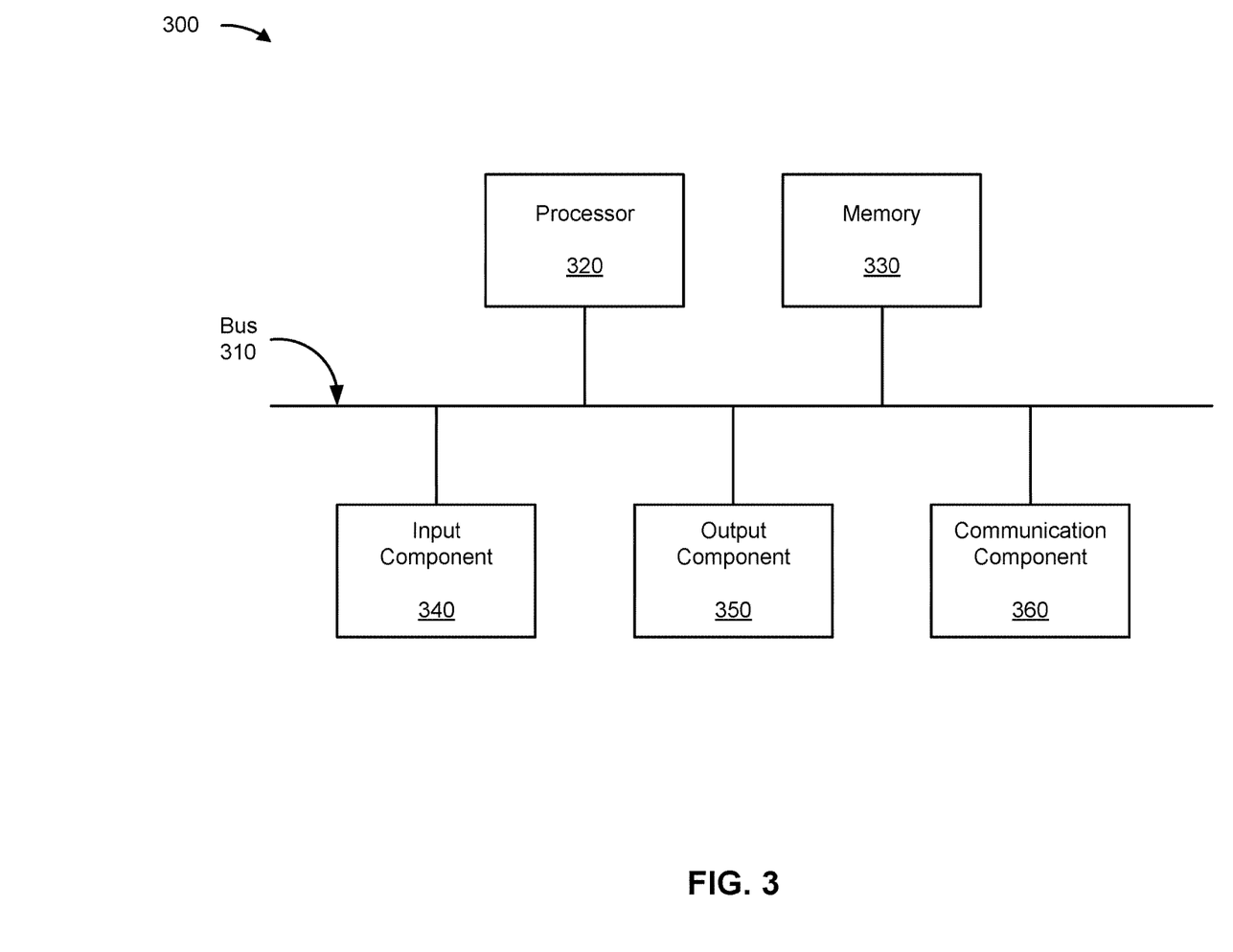
FIG. 3 is a diagram of example components of a device associated with providing a reauthorization request notification.

FIG. 3 is a diagram of example components of a device 300 associated with providing a reauthorization request notification. The device 300 may correspond to the SMF device 105, the UDM device 110, and/or the UDR device 115. In some implementations, the SMF device 105, the UDM device 110, and/or the UDR device 115 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
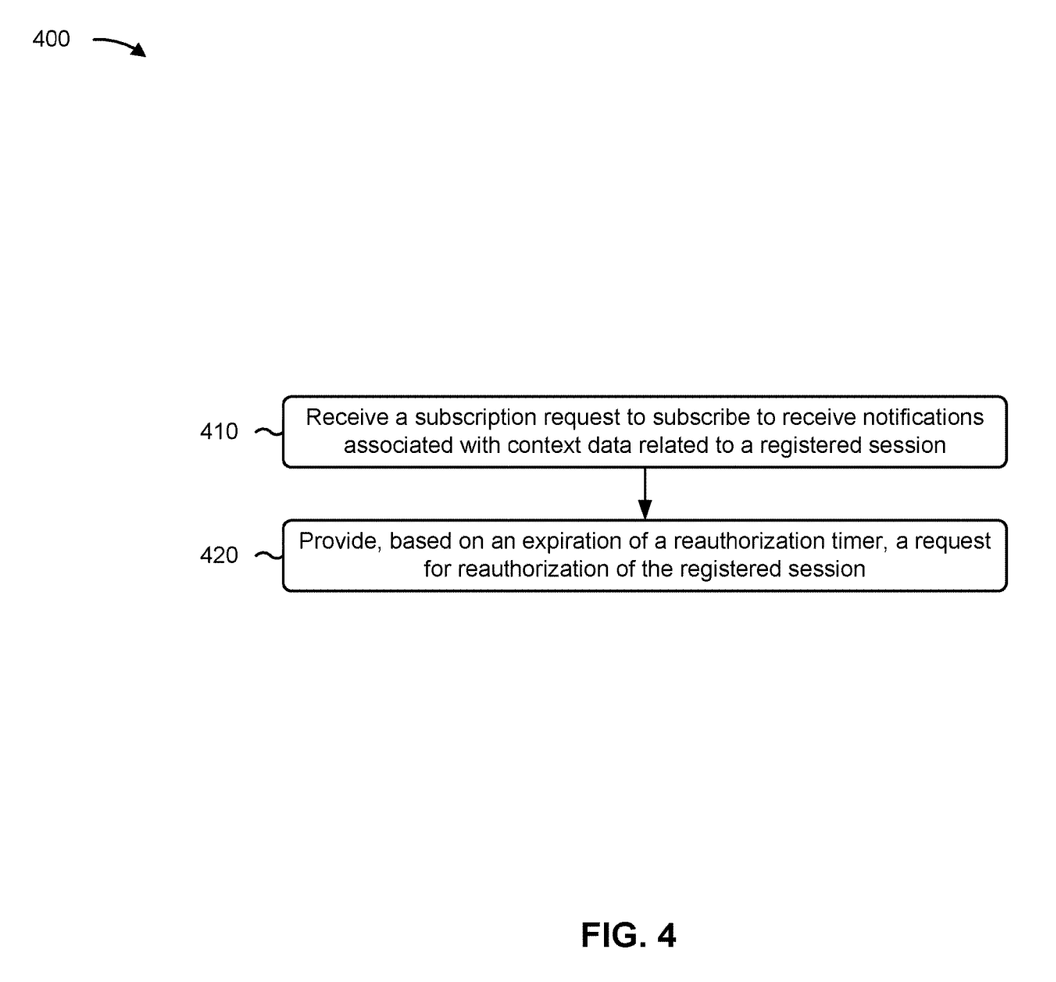
FIGS. 4-5 are flowcharts of embodiments of processes associated with a reauthorization request notification.

FIG. 4 is a flowchart of an example process 400 associated with providing a reauthorization request notification. In some implementations, one or more process blocks of FIG. 4 may be performed by a network device (e.g., the UDM device 110 and/or the UDR device 115). In some implementations, one or more process blocks of FIG. 4 may be performed by another device or a group of devices separate from or including the network device, such as an SMF device (e.g., the SMF device 105). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a subscription request to subscribe to receive notifications associated with context data related to a registered session (block 410). For example, the network device may receive a subscription request to subscribe to receive notifications associated with context data related to a registered session (e.g., a registered PDU session) associated with a UE. The registered session may be associated with a reauthorization timer that is associated with triggering the network device to provide a request for reauthorization of the registered session, as described above.

As further shown in FIG. 4, process 400 may include providing, based on an expiration of a reauthorization timer, a request for reauthorization a registered session (block 420). For example, the network device may provide, based on an expiration of the reauthorization timer, the request for reauthorization of the registered session, as described above.

In some implementations, process 400 includes receiving, by the network device and based on the request for reauthorization of the registered session, a status communication indicating that the registered session is inactive. The network device may remove, based on the status communication indicating that the registered session is inactive, the context data related to the registered session from a context data resource of the network device.

In some implementations, process 400 includes receiving, by the network device and based on the request for reauthorization of the registered session, the status communication in response to the request for reauthorization of the registered session. The status communication may include an attribute that indicates that the registered session is inactive. As an example, the attribute may be included in a JSON payload associated with the status communication.

In some implementations, the subscription request is received from at least one of: an AMF device, an SMF device, a NEF device, and/or a UPF device. In some implementations, the reauthorization timer is associated with an MNO.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
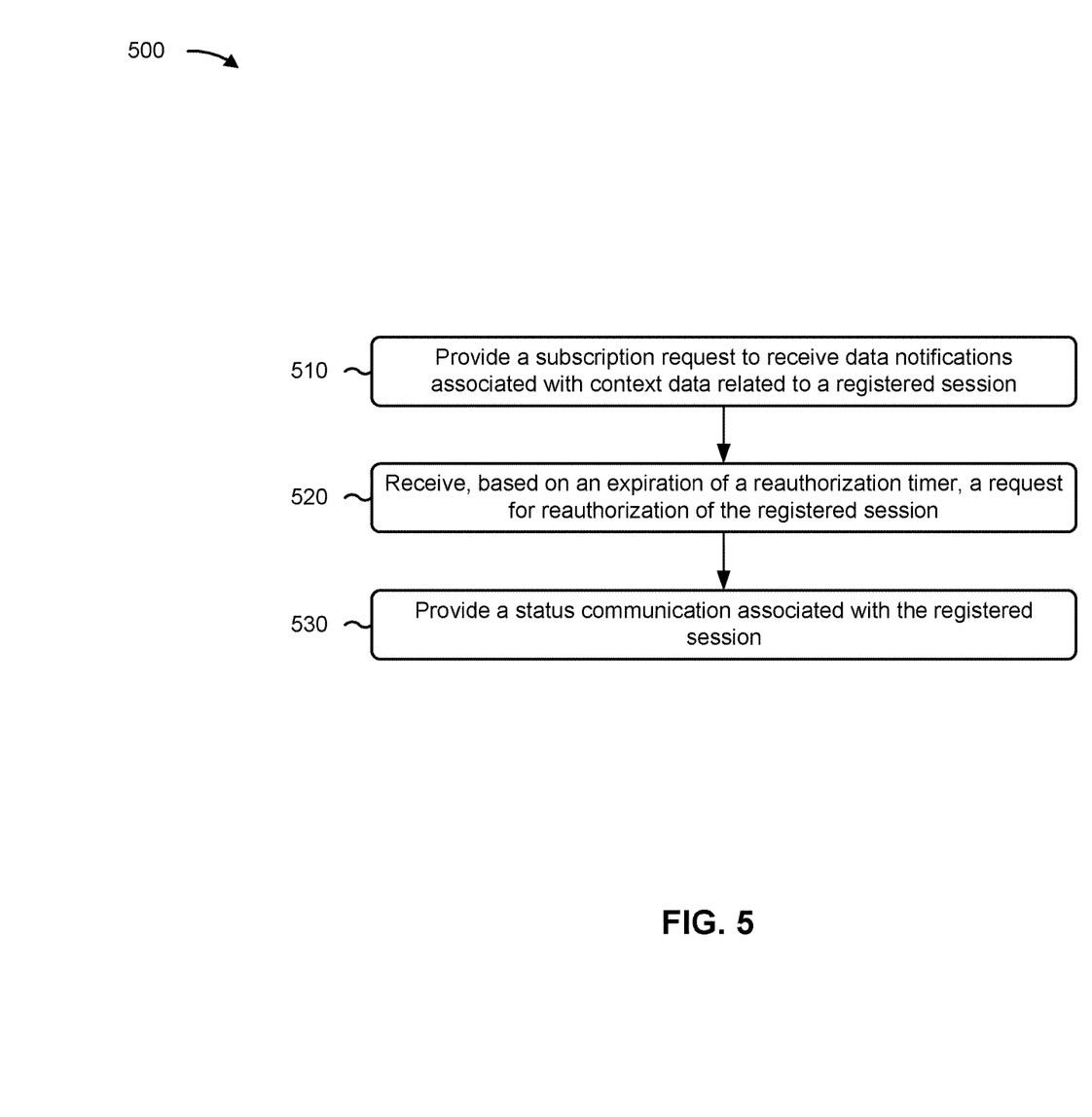

FIG. 5 is a flowchart of an example process 500 associated with providing a reauthorization request notification. In some implementations, one or more process blocks of FIG. 5 may be performed by a network device (e.g., the SMF device 105). In some implementations, one or more process blocks of FIG. 5 may be performed by another device or a group of devices separate from or including the network device, such as a UDM device (e.g., the UDM device 110) and/or a UDR device (e.g., the UDR device 115). Additionally, or alternatively, one or more process blocks of FIG. 5 may be performed by one or more components of device 300, such as processor 320, memory 330, input component 340, output component 350, and/or communication component 360.

As shown in FIG. 5, process 500 may include providing a subscription request to receive data notifications associated with context data related to a registered session (block 510). For example, the network device may provide a subscription request to receive data notifications associated with context data related to a registered session (e.g., a registered PDU session) associated with a UE, as described above. The registered session may be associated with a reauthorization timer that is associated with triggering a request for reauthorization of the registered session.

As further shown in FIG. 5, process 500 may include receiving, based on an expiration of a reauthorization timer, a request for reauthorization of a registered session (block 520). For example, the network device may receive, based on an expiration of the reauthorization timer, the request for reauthorization of the registered session, as described above.

As further shown in FIG. 5, process 500 may include providing a status communication associated with the registered session (block 530). For example, the network device may provide a status communication associated with the registered session in response to the request for reauthorization of the registered session, as described above. As an example, the status commutation may indicate that the registered session is inactive.

In some implementations, the request for reauthorization of the registered session may include an identifier of the registered session. The network device may determine, based on the identifier of the registered session, a status of the registered session. The network device may provide the status communication to indicate the status of the registered session. In some implementations, the status communication may include an attribute that indicates that the registered session is inactive. As an example, the attribute may be included in a JSON payload associated with the status communication. In some implementations, the network device may be at least one of an AMF device, an SMF device, a NEF device, and/or a UPF device. In some implementations, process 500 includes providing the status communication to at least one of a UDM device, or a UDR device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a network device, a subscription request to subscribe to receive notifications associated with context data related to a registered session associated with a user equipment (UE),
    wherein the registered session is associated with a reauthorization timer that is associated with triggering the network device to provide a request for reauthorization of the registered session; and
  providing, by the network device and based on an expiration of the reauthorization timer, the request for reauthorization of the registered session.

2. The method of claim 1, further comprising:
  receiving, based on the request for reauthorization of the registered session, a status communication indicating that the registered session is inactive; and
  removing, based on the status communication indicating that the registered session is inactive, the context data related to the registered session from a context data resource of the network device.

3. The method of claim 1, further comprising:
  receiving, based on the request for reauthorization of the registered session, a status communication in response to the request for reauthorization of the registered session,
    wherein the status communication includes an attribute that indicates that the registered session is inactive, and
    wherein the attribute is included in a JavaScript Object Notation (JSON) payload associated with the status communication; and
  removing, based on the attribute that indicates that the registered session is inactive, the context data related to the registered session from a context data resource of the network device.

4. The method of claim 1, wherein the network device is at least one of:
a unified data management (UDM) device, or
a unified data repository (UDR) device.

5. The method of claim 1, wherein the subscription request is received from at least one of:
an access and mobility management function (AMF) device,
a session management function (SMF) device,
a network exposure function (NEF) device, or
a user plane function (UPF) device.

6. The method of claim 1, wherein the reauthorization timer is associated with a mobile network operator.

7. The method of claim 1, wherein the registered session is a registered packet data unit (PDU) session.

8. A network device, comprising:
one or more processors configured to:
provide a subscription request to receive data notifications associated with context data related to a registered session associated with a user equipment (UE),
wherein the registered session is associated with a reauthorization timer that is associated with triggering a request for reauthorization of the registered session;
receive, based on an expiration of the reauthorization timer, the request for reauthorization of the registered session; and
provide a status communication associated with the registered session in response to the request for reauthorization of the registered session.

9. The network device of claim 8, wherein the status commutation indicates that the registered session is inactive.

10. The network device of claim 8, wherein the request for reauthorization of the registered session includes an identifier of the registered session, and
wherein the one or more processors, to provide the status communication in response to the request for reauthorization of the registered session, are configured to:
determine, based on the identifier of the registered session, a status of the registered session; and
provide the status communication to indicate the status of the registered session.

11. The network device of claim 8, wherein the status communication includes an attribute that indicates that the registered session is inactive, and
wherein the attribute is included in a JavaScript Object Notation (JSON) payload associated with the status communication.

12. The network device of claim 8, wherein the network device is at least one of:
an access and mobility management function (AMF) device,
a session management function (SMF) device,
a network exposure function (NEF) device, or
a user plane function (UPF) device.

13. The network device of claim 8, wherein the status communication is provided to at least one of:
a unified data management (UDM) device, or
a unified data repository (UDR) device.

14. The network device of claim 8, wherein the registered session is a registered packet data unit (PDU) session.

15. A non-transitory computer-readable medium storing a set of instructions, the set of instructions comprising:
one or more instructions that, when executed by one or more processors of a network device, cause the network device to:
receive a subscription request to subscribe to receive notifications associated with context data related to a registered session associated with a user equipment (UE),
wherein the registered session is associated with a reauthorization timer associated with triggering the network device to provide a request for reauthorization of the registered session; and
provide, based on an expiration of the reauthorization timer, the request for reauthorization of the registered session.

16. The non-transitory computer-readable medium of claim 15, wherein the one or more instructions, when executed by the one or more processors, that cause the network device to receive the subscription request to subscribe to receive the notifications associated with the context data that is associated with the UE, cause the network device to:
receive, based on the request for reauthorization of the registered session, a status communication indicating that the registered session is inactive; and
remove, based on the status communication indicating that the registered session is inactive, the context data related to the registered session from a context data resource of the network device.

17. The non-transitory computer-readable medium of claim 15, wherein the one or more instructions, when executed by the one or more processors, that cause the network device to receive the subscription request to subscribe to receive the notifications associated with the context data that is associated with the UE, cause the network device to:
receive, based on the request for reauthorization of the registered session, a status communication in response to the request for reauthorization of the registered session,
wherein the status communication includes an attribute that indicates that the registered session is inactive, and
wherein the attribute is included in a JavaScript Object Notation (JSON) payload associated with the status communication; and
remove, based on the attribute that indicates that the registered session is inactive, the context data related to the registered session from a context data resource of the network device.

18. The non-transitory computer-readable medium of claim 15, wherein the network device is at least one of:
a unified data management (UDM) device, or
a unified data repository (UDR) device.

19. The non-transitory computer-readable medium of claim 15,
wherein the subscription request is received from at least one of:
an access and mobility management function (AMF) device,
a session management function (SMF) device,
a network exposure function (NEF) device, or
a user plane function (UPF) device.

20. The non-transitory computer-readable medium of claim 15, wherein the registered session is a registered packet data unit (PDU) session.

* * * * *